March 31, 1942. A. LUNDQUIST ET AL 2,278,182
WEB SUPPLY MECHANISM
Original Filed Dec. 2, 1933 9 Sheets-Sheet 1

FIG. 1.

INVENTORS
Arnd Lundquist
Raymond A. Freeman
William C. Wieking
by Albert J. Norton
ATTORNEY March 31, 1942.   A. LUNDQUIST ET AL   2,278,182
WEB SUPPLY MECHANISM
Original Filed Dec. 2, 1933   9 Sheets-Sheet 2

INVENTORS
Arvid Lundquist
Raymond A. Freeman
William E. Wisking
by Albert J. Horton
ATTORNEY

March 31, 1942.  A. LUNDQUIST ET AL  2,278,182
WEB SUPPLY MECHANISM
Original Filed Dec. 2, 1933   9 Sheets-Sheet 5

INVENTORS
Arvid Lundquist
Raymond A. Freeman
William E. Wieking
by Albert J. Horton
ATTORNEY Patented Mar. 31, 1942

2,278,182

UNITED STATES PATENT OFFICE 2,278,182

WEB SUPPLY MECHANISM

Arvid Lundquist, New York, Raymond A. Freeman, Hudson, and William C. Wieking, Woodhaven, N. Y., assignors to R. Hoe & Co., Inc., New York, N. Y., a corporation of New York Original application December 2, 1933, Serial No. 700,652. Divided and this application December 31, 1937, Serial No. 182,716

26 Claims. (Cl. 242—58)

This invention relates to web supply mechanism for machines, such as, printing machines that operate on webs fed from web rolls, and has particular application to high speed rotary printing machines that are used for printing newspapers and similar products. Patent No. 2,155,430 was granted April 25, 1939, on an application of which this is a division.

It is desirable in press operation to replace the expiring web rolls in a printing machine with new rolls while the press is operating at high speed. Various types of mechanism have been provided for this purpose, some of which are operated entirely automatically while others operate on a semi-automatic principle.

The structure to which the present invention is applied, is in many respects similar to the structure disclosed in a copending application, Serial Number 596,508, now Patent No. 2,071,440, dated February 23, 1937, but in the present case, instead of being automatically controlled, certain movements are manually controlled. The speed of operation, however, is not retarded by the partial manual control.

Improved means are also provided for controlling the rotation of the roll during acceleration and deceleration of the machine.

Among the objects of this invention, one is to provide a web supply mechanism for machines that run at high speed while operating upon a web of material, in which the web fed from an exhausting web roll may be replaced with web from a replacement roll without reducing the speed of the machine.

Another object is to provide a web supply mechanism in which the web from a replacement roll is joined to the web of a running roll, in which the means for making the join is manually movable to a pre-pasting position.

Another object is to provide a web supply mechanism having a web deflector adapted to press a running web against an adhesive portion on the web end of a replacement roll, the said deflector being manually movable into a pre-pasting position and power actuated upon the energization of an electrical circuit.

Another object is to provide a web supply mechanism having a web deflector manually movable to an operating position and an electrically controlled timing means for timing the operation of the web deflector with relation to a pasted area on the end of the web of a replacement roll.

Another object is to provide a web supply mechanism having improved means for severing the web of an expiring roll after the web of a replacement roll has been joined thereto, the operation of said severing means being coordinated with the joining of the webs, whereby the web will be severed a definite distance back of the point where the join is made, which distance will be substantially the same at every operating speed.

Another object is to provide an improved severing means which will be actuated by means of a lug rotatable with the web replacement roll and a latch releasable thereby to actuate a cutter blade and cause same to sever the web of the expiring web roll after a join is made with the replacement roll.

With the foregoing and other objects in view, which will appear in the following description, the invention resides in the combination and arrangement of parts which will be fully described in connection with the accompanying drawings and the novel features pointed out in the claims hereunto annexed.

The preferred embodiment of the invention is illustrated in the accompanying drawings, wherein.

Figure 1:
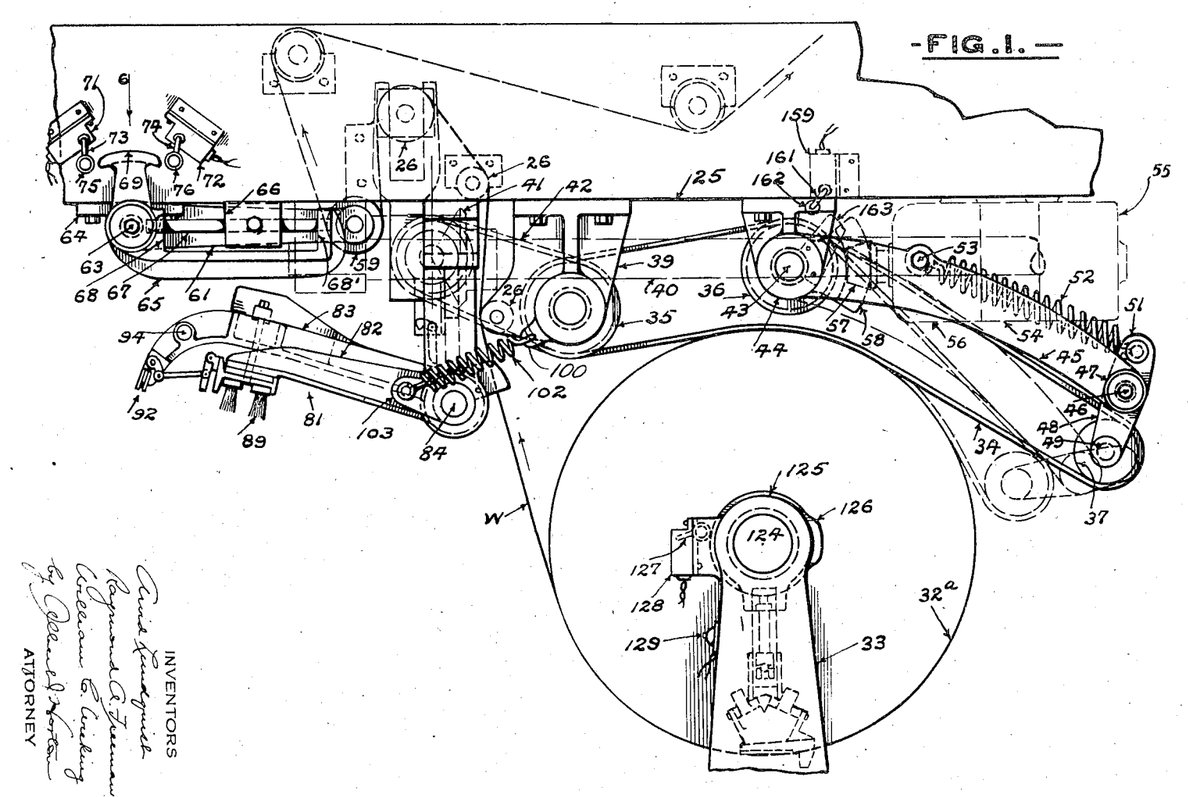
Figure 1 shows an elevational view of the web supply mechanism as seen from the head end of the device, and showing the web deflecting and severing mechanism in a non-operative position.
Figures 2, 6:
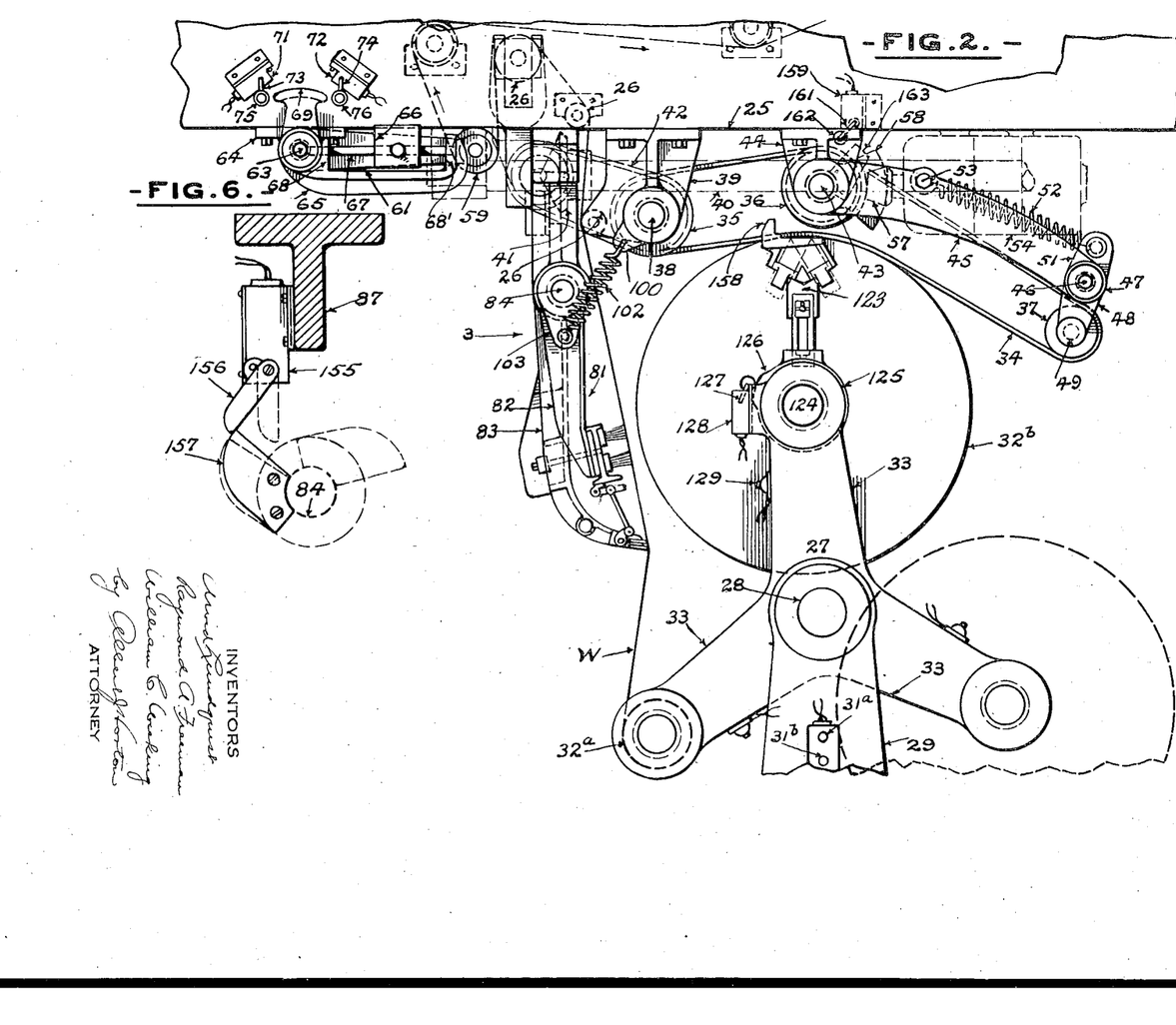
Figure 2 shows a view similar to Figure 1 with the parts in pre-joining position and at the time the web of the replacement roll is about to be joined to the web of the running roll, the latter having been reduced to about the point of exhaustion.
Figure 6 is an enlarged detail view of a motor cut-out switch operable by the swinging movement of the web deflector frame.
Figure 5:
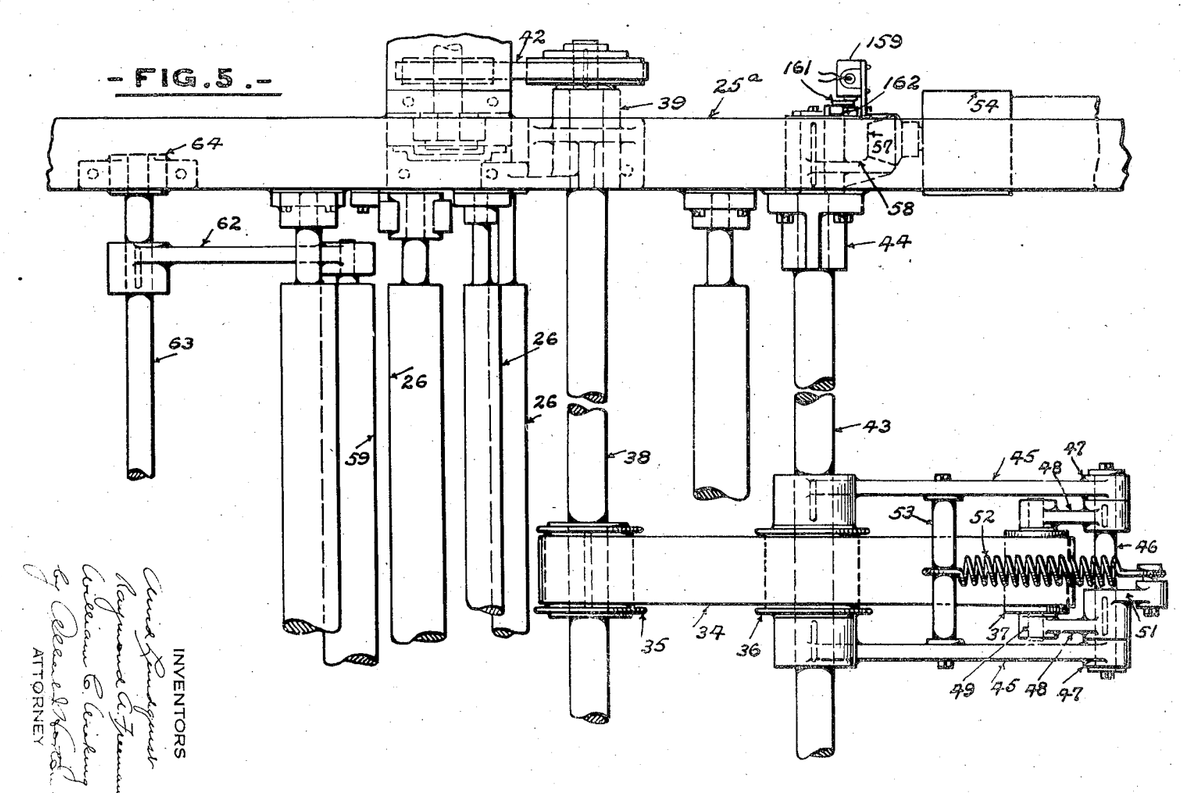
Figure 5 is a plan view looking at one side of the machine, showing the web tensioning belt mechanism for the web roll and the driving means therefor.

Referring to Figures 1 and 2 of the drawings, reference character 25 indicates one side member of a printing machine base frame, another side member 25a being shown in Figure 5. Between said members 25 and 25a are supported the usual web guide rollers 26, while above same, the usual printing mechanism not included in this invention is mounted.

A reel 27 is rotatably mounted upon a shaft 28 which shaft is carried by pedestals 29, the upper ends of same being shown in Figure 2. A motor drive means indicated at M of the wiring diagram is connected in driving relation with the shaft 28 and is energized periodically by pressing one of two buttons 31a, 31b to energize the motor circuit and cause the motor M to rotate the said reel. Web rolls 32 are supported on arms 33, projecting outwardly from the reel 27, in any conventional manner. In Figure 1, one web roll 32a is shown mounted on the reel in an uppermost position and has the web W feeding therefrom over the guide rollers 26 which will be referred to hereinafter as the running web roll. In Figure 2, another web roll 32b is shown as having taken the place of the aforementioned running web roll 32a, and will be referred to hereinafter as the replacement roll.

The normal running position for the running web roll is the uppermost position as shown in Figure 1, but after the roll has been reduced to a certain predetermined diameter, an attendant will energize the motor circuit to rotate the reel in a counter-clockwise direction by pressing the push button 31a, whereby the reel will be rotated to move a replacement roll into the upper position to be joined with the web running from the expiring roll, which latter roll will have been moved downward to the position shown in Figure 2.

It is desirable to maintain a constant tension on the running web at all times to accomplish the best results in printing machines of the high speed type. By means of a mechanism according to one of the features of this invention, any slight variation in tension upon the running web is immediately corrected, by increasing or decreasing a braking pressure which is constantly applied to the running web roll.

Said mechanism comprises one or more endless belts 34, guided over pulleys 35, 36 having fixed axes and a third pulley 37 having a movable axis. The pulley 35 is mounted on a shaft 38 journalled in bearings 39, which bearings are secured to the side members 25, 25a of the machine base frame. A suitable drive is provided for the shaft 38 through gearing indicated at 41 and a sprocket and chain connection 42, which are preferably driven from a driving source in the machine, such as, indicated by the shaft 40. Said gearing 41 is timed to maintain the running speed of the belt at a speed which is slightly slower than that of the running web so as to provide a constant braking action on the web roll, which is varied according to the amount of wrap provided by the belt around the web roll and by the belt tension.

The pulley 36 is rotatably mounted on a shaft 43 journalled in bearings 44 which are also secured to the base frame members 25 and 25a, said shaft 43 also having arms 45 fixed thereto (Figure 5), positioned at either side of the pulley 36. A short shaft 46 is rotatably mounted between the projecting ends 47 of said arms 45 and has secured thereto a pair of downwardly projecting pivotal arms 48, between which a pulley 37 is rotatably mounted on a shaft 49. One of said pivotal arms has an upwardly projecting end 51 which has a coil spring connected thereto, the other end of which spring is attached to a stationary cross bar 53 secured between the arms 45, and is adapted to rock the pivotal arm 38 outward to cause the pulley 37 to apply a tension on the endless belt 34.

While the above described endless belt mounting is described in the singular, it is to be understood that more than one mounting may be used. In the particular structure of this invention two belt mountings are provided at substantially the same distance from each side of the base frame members 25, 25a, in the same relation as that indicated in Figure 5, which shows the location in relation to the one side member 25a.

Figure 16:
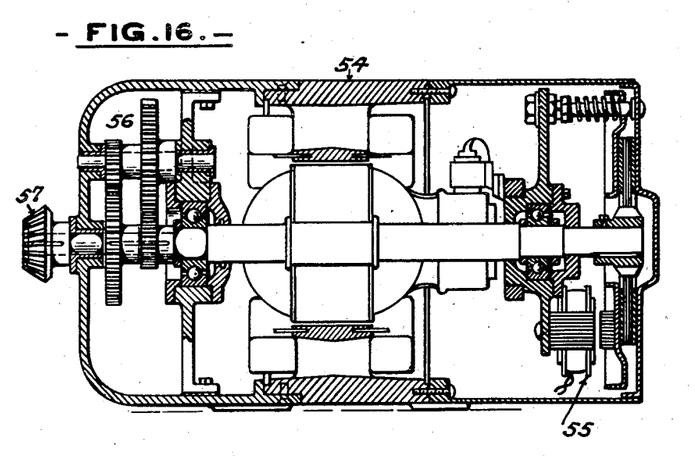
Figure 16 is substantially a vertical section, on the line 16, of Figure 17, through a motor used to vary the movement of the web tensioning mechanism.
Figure 17:
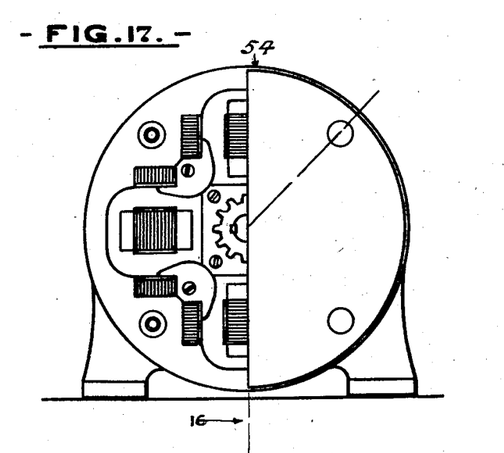
Figure 17 is an end view of the motor shown in Figure 16 with a part broken away.

A motor 54, shown in detail in Figures 16 and 17, is mounted on the side member 25a, which motor is provided with a magnetic brake generally indicated at 55 and a reduction gearing 56. A bevel pinion 57 meshes with a bevel gear segment 58 which segment is keyed to the shaft 43. When said motor is energized, in a manner to be hereinafter described, the gear segment will be partially rotated in a clockwise or counter-clockwise direction and thereby rock the shaft 43 and the arms 45 in the same direction. In so doing, the wrap of the belt upon the running web roll is increased or decreased in varying degree in response to variation in web tension and the braking pressure of same is varied accordingly.

It will be observed that by mounting the movable pulley in the manner described, it is possible to use a short swinging bracket for the movable pulley which is light in weight and does not require much space for movement. It will also be observed that the tension of the spring 52 will increase as the wrap of the belt is increased and thus further increase the braking action of the belt.

The energization of the motor 54 is controlled by the movement of a floating web roller 59, which roller is mounted so as to engage the running web and change its position when the web tension is increased or decreased. The mounting for the floating roller comprises arms 61 and 62 which carry the said roller 59 at one end thereof and which have their opposite ends mounted on a shaft 63, said shaft being supported in bearings 64 secured to the side base frame members 25—25a.

A weight carrying arm 65 is mounted at one end of the shaft 63 as shown in Figures 1 and 2, and is adapted to support a weight 66 which is adjustably mounted upon a rod 67 suspended between two bearing portions 68—68' on said arm. By the adjustment of this weight the pressure of the floating roller upon the web can be adjusted to set the tension at which the web is to be run. A cam shoe 69, formed at the end of an upward extension on the pivotal end of the arm 65, is positioned between two limit switches 71—72. Each of said limit switches has an arm 73—74 extending downwardly therefrom and each arm has a roller 75—76 at the end thereof, positioned directly in the path of the cam shoe 69. Each switch is in a normally open position and is electrically connected with the motor 54 in such manner, that when either one of the switch arms 73, 74 is rocked, a circuit will be completed which will drive the motor 54 in a clockwise or counter-clockwise direction, to thus vary the braking action of the endless belt 34 upon the running web roll, as previously described, and thereby return the web to its normal running tension. The said rocking action of the switch arms is caused by the rocking movement of the cam shoe 69, through the movement of the floating roller 59, as the position of the roller changes, said change being due to an increased or decreased tension on the running web as it is drawn from the roll.

A uniform running tension on the web running to the machine is thus automatically maintained by means of the above described mechanism and is directly controlled by the movement or change in position of the floating web guide roller.

Having described the mechanism for controlling the tension of the running web, the mechanism for joining the web of an expiring web roll with that of a replacement roll and the means for severing the web of the expiring roll after a join is made, will now be described.

Figures 3, 4:
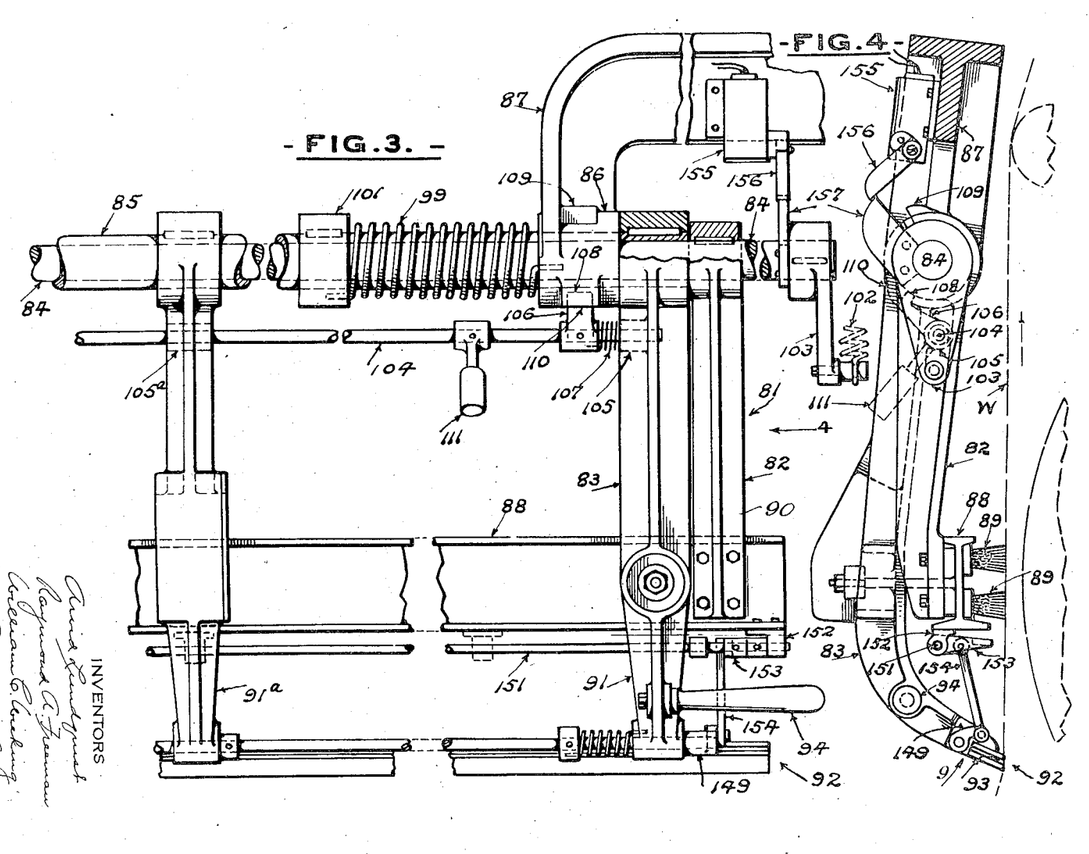
Figure 3 is an enlarged view looking in the direction of the arrow 3 of Figure 2 showing a rear elevation of one end of the web deflecting and severing mechanism with parts broken away.
Figure 4 is an end view of the parts shown in Figure 3 looking in the direction of the arrow 4 on Figure 3.

Referring to Figures 1 to 4, a twin frame structure indicated generally by the reference character 81, comprises a web deflector frame 82 carried by a shaft 84 and a cutter supporting frame 83 carried by a sleeve 85 both of which frames are movable about the same axial center. Said shaft 84 passes through the sleeve 85, which sleeve is journalled in bearings 86 forming parts of two brackets 87, depending from and secured to the base frame members 25—25a. The twin frame structure is best shown in Figure 3 in which the mechanism located at one end and center of said frame structure are shown, it being understood that the mechanism on the opposite end will be a duplicate.

The web deflecting frame structure generally comprises two end arms 90 fixed on the outer ends of the shaft 84, which project beyond the ends of the sleeve 85, and have a beam 88 secured to the outer portions of the projecting ends thereof. Brushes 89 are mounted upon said beam which project outward and are adapted to be brought into engagement with the surface of the running web previous to making a join between the web of the expiring web roll and the web of the replacement roll, in such manner as will be hereinafter described.

Figures 9, 10, 11:
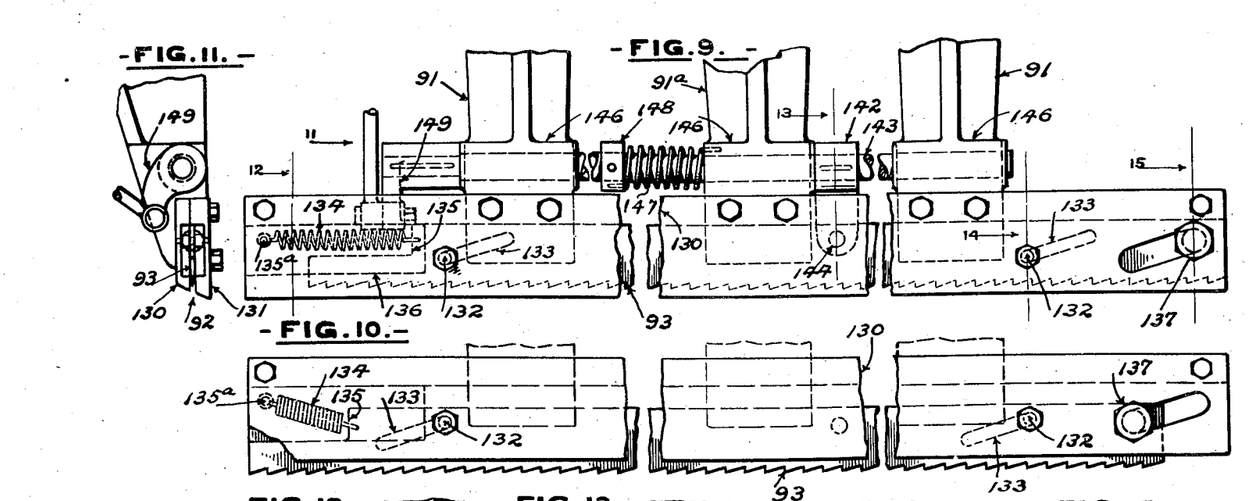
Figure 9 is an inverted plan view of the web severing mechanism taken in the direction of the arrow 9, Figure 4, and showing the cutting knife in a retracted position.
Figure 10 is a view similar to Figure 9 showing the cutting knife in a released or web cutting position.
Figure 11 is an end view taken in the direction of the arrow 11 on Figure 9.

The cutter supporting frame comprises two outer arms 91 and a centrally disposed arm 91a which are keyed to the sleeve 85, with the outer arms positioned adjacent to the web deflecting frame arms 90, and have a cutter supporting sheath 92 secured at the lower ends thereof as shown in Figures 9 to 11, between which a cutter 93 is slidably mounted. A handle 94 is secured to one arm 91 as shown in Figure 3.

The web deflecting frame and cutter supporting frame are normally joined together by means of a latch shown in Figure 7, which comprises a hook 95 adjustably secured to the web deflector frame beam 88, and a pin 96 secured at one end of a rocking lever 97, which lever forms part of a latch releasing mechanism assembled within a housing 98, on the arm 91a, and which will be hereinafter described.

It will be observed that since the twin frame members are latched together, they will thus move in unison when moved from a non-operating position as shown in Figure 1 to an operating or pre-joining position as shown in Figure 2. A heavy counterbalancing spring 99 is mounted over the sleeve 85, and has one end secured to a portion of the bearing 86 and the other end secured to a collar 101 keyed to the sleeve 85 as clearly indicated in Figure 3. The spring action is such that the tension upon same is increased when the frames are lowered, thereby retarding the downward movement and providing a counter balancing effect for the weight of the frame to permit same to be easily lifted. Another coil tension spring, indicated at 102 in Figures 1, 2 and 3, is tensioned between a fixed lug 100 on the bearing 39 and a lever 103 keyed to the shaft 84, the action of which spring provides the power means for actuating the web deflector preparatory to making a join between the web of the expiring web roll and the web of the replacement roll. Said spring 102 also provides additional means to hold the frame structure in a raised position due to its movement off center as shown clearly in Figure 1.

A shaft 104, (Figure 3) is rotatably mounted in bearings 105—105a on the cutter frame arms 91 and 91a respectively and has secured thereto a dog 106. A counterbalancing spring 107 is mounted over said shaft and has one end in engagement with the dog 106 and the other end in engagement with the bearing 105 and is tensioned so as to hold the end 108 of the dog against the peripheral surface of one of the bearing members 86 on the bracket 87. Two lugs 109—110 are provided on the periphery of said bearing member 86 in the path of the end 108 of the dog 106 and are adapted to be engaged by said dog when the twin frame structure is in a lowered position as indicated in Figure 4 or when in a raised position. A handle 111 is secured to the rod 104 to provide a means for manually releasing the dog 106 from the lug 110 when it is desired to swing the twin frame structure upward. When the twin frame structure is in a raised position, as in Figure 1 the end of the dog will engage the upper lug 109 which lug will function as a stop to prevent any further movement upward by the action of the tension spring 102 and when said twin frame structure is in a lowered position, the end of the dog will engage the lower lug 110 and thereby cause the brush portion 89 of the web deflector frame and the sheath 92 of the cutter frame to be set in a fixed position with relation to the running web of the expiring web roll.

The pulling power of the tension spring 102 becomes effective at the instant the latch pin 96 is released from the hook 95, which release separates the web deflector frame from the cutter frame and allows the web deflector frame to be pulled forward, while the cutter frame remains stationary.

The action of the latch releasing mechanism will now be described.

Figure 7:
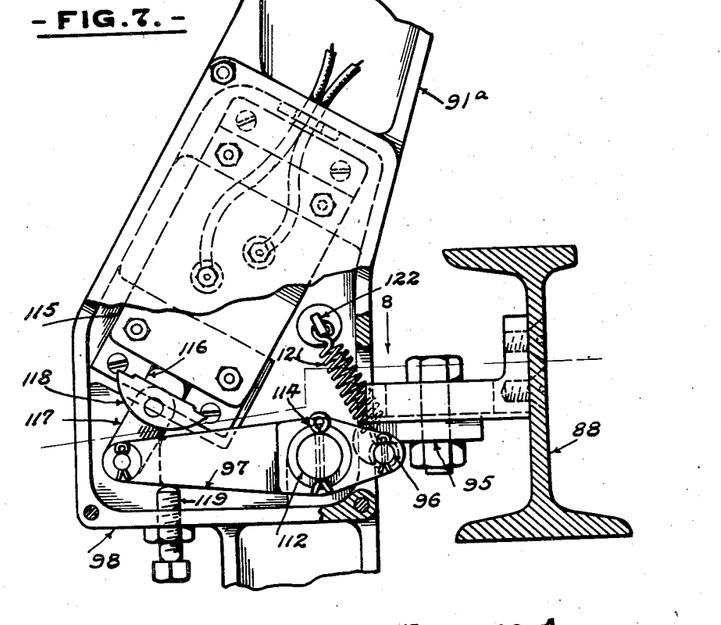
Figure 7 is an enlarged detail view showing a solenoid operated latch member on the web deflector frame and an anchoring arm therefor.
Figure 8:
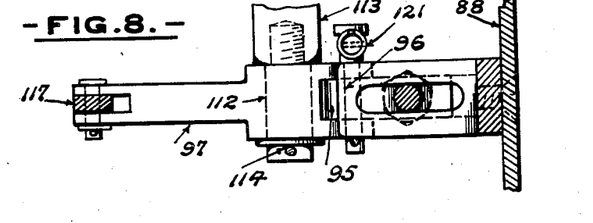
Figure 8 is a section taken in the direction indicated by the arrow 8 on Figure 7.

Referring to Figures 7 and 8, the aforesaid rocking lever 97 is mounted on a stud 112 projecting from a boss 113 within the housing 98, and is held thereon by means of a washer and pin indicated at 114. The lever is adapted to be rocked about said stud 112 by means of the action of a solenoid magnet 115. Said solenoid has a plunger 116, and a link 117 connecting same with a bifurcated end of the lever 97. When energized, the plunger will be drawn into the solenoid and the lever 97 will be rocked about the stud 112, which movement will release the pin 96 from the hook 95 and thereby allow the web deflector frame to be pulled forward by the spring 102 to a web joining position shown in Figure 21. A stop 118 is provided on the plunger 116 to limit the inward movement of same and an adjustable stop screw 119 is provided within one wall of the housing 98 to limit the downward movement of the lever. A spring 121 tensioned between one end of the latch pin 96 and an ear 122 on one wall of the housing 98 is provided to hold the pin 96 in normal engagement with the hook 95.

Before said latch releasing solenoid is energized however, a timing means which rotates with the replacement roll, is adapted to close the solenoid operating circuit at the desired time to allow the web deflecting operation to occur after an adhesive portion on said replacement roll has passed a position opposite the brushes on the web deflector frame. Said timing means will now be described.

The replacement roll 32b is mounted on a shaft 124, which shaft is journalled in bearings 125 provided on each arm of the reel 27. A means is provided for holding the end of the web of the replacement roll in engagement with the body portion thereof, as indicated at 123 and has a cam member 126 thereon which is rotatable with the replacement roll. A switch arm 127, on a circuit closing switch 128, is normally positioned in the path of the cam 126 and is moved to close said switch 128 upon each rotation of said cam but is ineffective until a push button 129 on the arm 33, supporting the replacement roll, is depressed.

An adhesive may be provided on the outer surface of the end of the web replacement roll in any suitable manner for the running web of an expiring web roll to be brushed against by the brush portion 89 of the web deflecting frame 82 at the time a join is made. One method of preparing the adhesive portion of a replacement roll for a web joining operation is disclosed in a copending application, Serial Number 578,270, now Patent No. 1,995,269, dated March 19, 1935.

When the expiring web roll is reduced to a diameter of almost complete exhaustion, as shown in Figure 2, the push button 129 on the replacement roll arm is pressed by the attendant and at the instant thereafter that the cam 126 moves the switch arm 127, a circuit will be closed to energize the latch releasing solenoid 115. This condition occurs immediately after the adhesive portion has passed the brush contacting area of the web deflector frame 82 in order to allow sufficient time for the said web deflector frame to swing forward when released to move to a web joining position, shown in Fig. 21. Due to the high speed at which the replacement web roll rotates, the time between the depression of the button 129 and the action of the latch releasing solenoid 115, is almost instantaneous.

Figure 21:
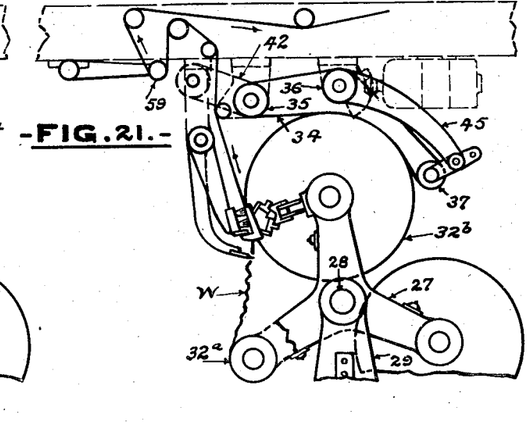

The energization of the solenoid 115 will therefore release the web deflector frame, to allow it to be pulled forward by the tension of the springs 102 and cause the brushes 89 to force the expiring web against the surface of the replacement web roll as shown in Figure 21, and when the adhesive portion on said surface reaches a position opposite the brushes 89 the web end of said roll will adhere to the web of the expiring web roll and any holding means will be automatically released.

Figures 12, 13, 14, 15:
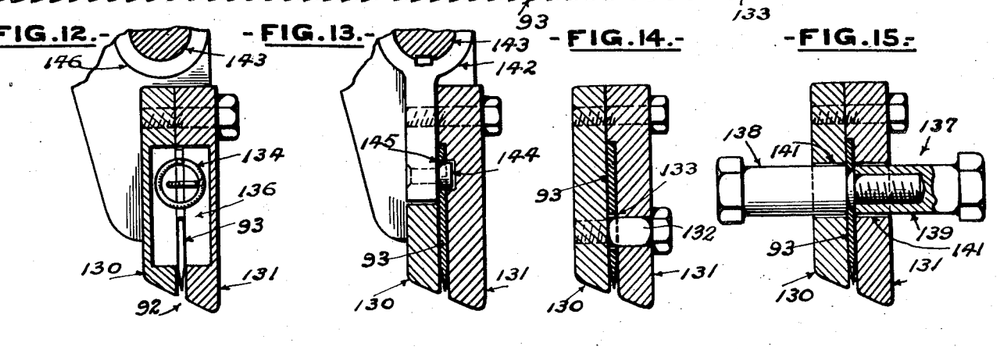
Figures 12, 13, 14 and 15 are sectional views taken in the direction of their respective arrows on Figure 9.

Immediately after the join is made, the cutter mechanism is actuated to sever the expiring web by the action of a lug 158 on the upper end of the replacement roll web holding mechanism 123, (Figure 2), in a manner to be hereinafter described. The said cutter mechanism, best shown in Figures 3 and 4 and Figures 9 to 15, comprises a cutter blade 93 slidably mounted between the upper and lower plates 130, 131 of the sheath 92. Guide studs 132 pass through the upper and lower sheath plates and through angularly disposed guide slots 133 in the cutter blade 93. A spring 134, tensioned between one end 135 of the cutter blade 93 and a pin 133a between the sheath plates 130, 131 and positioned within a recess 136 in said sheath, is adapted to pull the cutter blade from a normally inoperative or locked position as shown in Figure 9, to a cutting position as shown in Figure 10. A resetting handle 137 is secured to the cutter blade and comprises two posts 138 and 139 which project through clearance openings 141, 141 in the sheath plates and are joined together as shown in Figure 15.

A means is provided for locking the said cutter blade in its retracted position, which comprises a rocking arm 142 secured to a rock shaft 143, and has a pin 144 secured at the outer end thereof, which is adapted to engage an opening 145 in the cutter blade 93 and thereby provide a latch for said cutter blade when retracted. (See Figure 13). The said rock shaft 143 is mounted in bearings 146 provided at the lower ends of the cutter frame arms 91—91a. A coil spring 147 mounted over the shaft 143 (see Figure 9) has one end secured to one end of a bearing 146 and the other end secured to a collar 148 fixed to the shaft 143 and is tensioned so as to normally hold the latch pin 144 on the arm 142 in engagement with the opening 145 in the cutter blade 93. A rocking lever 149 is also secured to one end of the shaft 143.

A shaft 151 is supported by bearings 152 secured to the lower surface of the web deflector frame beam 88, as shown in Figures 3 and 4, and has mounted thereon a lever 153 which lever is joined to the above rocking lever 149 by means of a link 154.

The front of said lever 153 is shown as spaced a short distance away from the bottom of the beam 88, which distance is increased when the web deflector moves forward to the web joining position. The lug 158, previously referred to as on the upper end of the web holding mechanism 123, rotates with the web roll 32b and is adapted to strike the lower free end of the lever 153 and rock same about the shaft 151. This movement will cause the link 154 to move upward and the rocking lever 149 to be rocked in a counterclockwise direction. The arm 142 will thus be rocked to release the latch pin 144 from the opening 145 in the cutter blade 93 and thereby allow the cutter blade to be snapped diagonally forward under the influence of the spring 134 so that its toothed edge will extend beyond the forward edge of the sheath 92 to pierce the web of the expiring web roll below the join. It is to be particularly noted that the web of the expiring web roll will be stretched tightly across the ends of the upper and lower sheath plates 130 and 131, when the cutter frame is lowered to a web pre-cutting position, as is clearly shown in Figures 2 and 4. Therefore, the taut condition of the web at this point at the end of the sheath plates will cause the teeth of the cutter blade to easily penetrate the web and sever same.

At the time a join is being made, it is desirable to break the circuit to the motor 54 to prevent same from varying the pressure of the belt 34 upon the replacement web roll 32b. A circuit controlling mechanism is therefore provided which comprises a switch 155 secured to the bracket 87 and has a switch actuating arm 156 mounted thereon. A cam plate 157 shown in Figures 3, 4 and 6, is secured to the tension spring lever 103 on the web deflecting frame shaft 84 and is adapted to be rocked when the twin frame structure is moved to and from a web joining position. Referring to Figure 6, the switch actuating arm 156 is shown as moved to a motor circuit breaking position by the cam plate 157, which position agrees with the lowered position of the twin frame structure shown in Figure 4. Immediately after the web deflector frame is released to join the web, the cam plate 157 will pass beyond the switch actuating arm 156 and said arm 156 will drop to its normal vertical position indicated in dotted lines. On the return movement of the cam plate 157, i. e., when the twin frame structure is raised, the switch actuating arm will be kicked upward without effecting the switch, then will drop back to its normal vertical position.

A limit switch is also provided at 159, Figures 2 and 5, and has an operating arm 161 with a roller 162 at the end thereof, which roller extends in the path of a lug 163 on the hub of the gear segment 58. If the arms 45 are raised beyond a certain predetermined limit the lug 163 will strike the roller 162 and break the circuit to the motor 54 to make same inoperative for the less tension movements of the arms 45.

Figure 22:
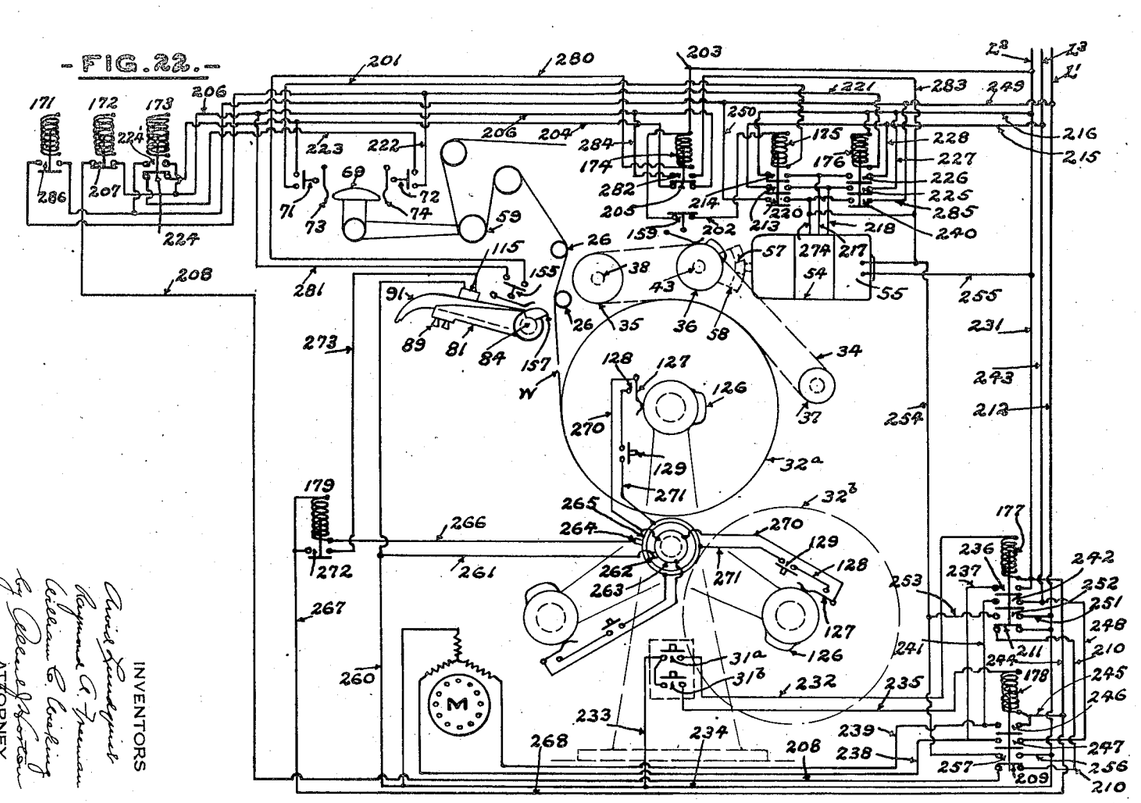
Figure 22 is a wiring diagram of the electrical switches employed in the control of the web roll supply mechanism.

The various limit switches, operating motors, etc. heretofore referred to and other solenoids, relays and the like are indicated diagrammatically in the wiring diagram illustrated in Figure 22 including all of the circuits therefor, all of which cooperate in the complete operation of the apparatus.

Referring to said wiring diagram, many of the parts as previously described, are diagrammatically shown and also some which have not as yet been described, such as an emergency stop operating relay 171 which is energized to actuate the motor 54 whereby braking pressure is applied to the belts 34, a main motor relay 172 which is energized simultaneously with the main driving motor contactor coil (not shown) and a threader relay indicated at 173 which is energized only when the press drive is operating at web threading speed. The purpose of the latter relay is to open the circuit to the switch 72 by breaking the circuit on the contacts 224 and to close the circuit to the switch 71 by bridging the contacts 224', whereby the motor 54 is permitted to operate for less tension, but is inoperative for more tension. At 174 a relay is shown for energizing the magnetic brake 55 and to provide a normally closed contact 205 when deenergized; 175 and 176 indicate relays for actuating the motor 54 in a direction to decrease or increase the belt tension respectively; 177 is a relay which is energized by the upper push button 31a in the mounting 31 to drive the reel 27 in a forward or counter-clockwise direction, and 178 is a similar relay which is actuated by the lower push button 31b to reverse the direction of the reel 27.

Figure 18:
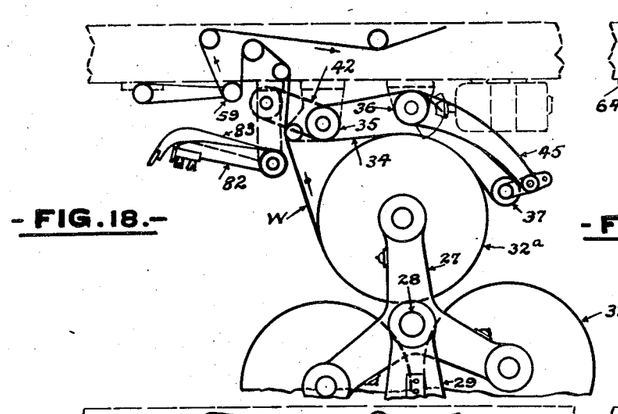
Figures 18, 19, 20 and 21 are diagrammatic views showing positions of some of the major components of the web supply mechanism during successive steps in its operation, as seen from the head of the machine.

The position of the parts shown in the diagram indicate a normal operating position with the main motor driving, and agree with the positions shown in Figures 1 and 18, wherein the web W is being drawn from the running web roll 32a and the web joining and cutting mechanism are in a raised or non-operative position.

While the mechanism is running normally with the web feeding at the desired tension, the motor 54 is idle and the magnetic brake circuit is deenergized, thus causing the motor brake 55 to hold and thereby maintain the arm 45 in a fixed position.

As soon as the tension of the running web varies, it immediately causes a change in position of the floating roller 59 and rocks the cam shoe 69 to the right or to the left to close one of the two switches 71 or 72. If the tension of the running web is more than the desired tension, the said cam shoe 69 will rock to the left and cause the contacts on the switch 71 to be closed. When said contacts are closed, a circuit is completed to the motor 54 which is traced from the line L2 through conductor 203, normally closed contacts 159, conductor 202, relay coil 175, conductor 201 and the closed switch 71, then through the conductor 204, normally closed contacts 205, conductor 206, closed contacts 207, conductor 208, closed contacts 209, conductor 210, closed contacts 211 and conductor 212 to the line L1. The relay 175 is thus energized which closes three sets of contacts 213, 214 and 220 which energize the motor 54, and the circuit to the brake 55. The circuit to energize the motor is a conventional three phase circuit from line L1, L2 and L3, and may be traced as follows:

From L1 through conductors 249 and 250 through contactor 220, conductor 274 to motor 54; from L2 through conductor 216, contactor 214, conductor 217 to motor 54; from L3 through conductor 215, contactor 213, conductor 218 to motor 54. The motor 54 is thereby driven in a direction which will reduce the braking pressure of the belt 34 upon the running web roll until the floating web roller 59 returns to its normal running position, whereupon the circuit is again broken.

When the tension of the running web is less than the desired tension, the floating roller will drop and the cam shoe 69 will rock to close the switch 72 and thereby cause a circuit to be closed which will drive the motor 54 in a reverse direction to provide a greater braking pressure upon the running web roll through the belt 34. Said latter circuit is traced from the line L2 through the conductor 216, relay coil 176 and conductor 221 then through a conductor 222, switch 72 and a conductor 223, then through a normally closed contact 224, which is adapted to be opened by the action of the threader relay coil 173, then through the conductor 204 and the normally closed contact 205, through the conductor 206, closed contacts 207 of the main motor, then through the aforesaid conductor 208, contacts 209, conductor 210, switch 211, and conductor 212 to the line L1. The relay coil 176 is thus energized which closes three sets of contacts, 225, 226 and 240 and connects the motor 54 with the line L1, L2 and L3 and also energize the circuit to the brake 55. The circuit which is set up under these conditions will reverse the drive of the motor 54 to increase the braking tension of the belt 34 on the running web roll 32a, and may be traced as follows: L1 through conductors 249, 205, contact 240, conductor 274, to motor 54. From L2 through conductors 216, 227, contact 225, conductor 218 to motor 54. From L3 through conductors 215, 228, contact 226, conductor 217 to motor 54.

Figure 19:
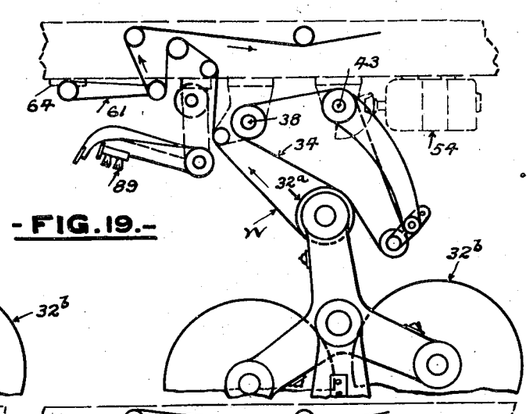
Figure 20:
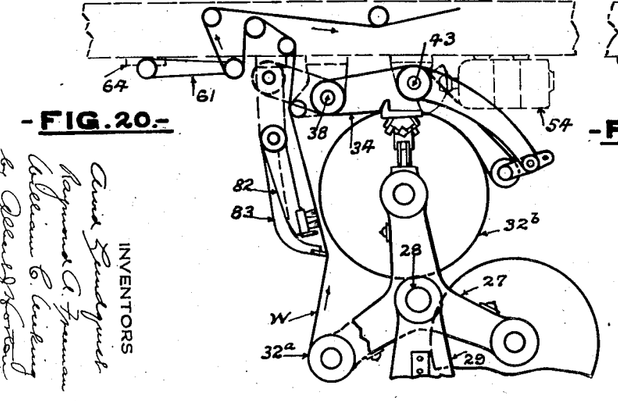

When the running web roll 32a is reduced in size to about the proportionate size shown in Figure 19, the attendant will press the upper button 31a in the push button box 31 to close a circuit to the reel driving motor M, which will drive the said reel in a counter-clockwise direction to move the running web roll 32a and a replacement roll 32b to the relative positions shown in Figure 20 and Figure 2. The circuit completed by pressing the said upper button is traced from the line L2, through conductor 231, relay coil 177, conductor 232, push button 31a, conductors 233, 234 and 212 to the line L1. A similar circuit, which is energized when the lower push button 31b is pushed to reverse the direction of the reel, is traced from the line L2 through the conductors 231 and 244, 245, relay coil 178, conductor 235, push button 31b, conductors 233, 234 and 212 to the line L1.

The energization of either of the above mentioned push buttons 31a or 31b will thus energize one of the coils 177 or 178, whereby contacts are made to complete a circuit to the motor M to drive same in a forward or reverse direction and to energize the circuit to the brake magnet in motor 54 and also to break the circuit to switches 71 or 72 in order to make the motor circuit inoperative while the reel is moving. The circuit to energize the motor M is also a conventional three phase circuit from line L1, L2 and L3. The circuit to the motor M while turning the reel in a counter-clockwise direction may be traced as follows: from L2 through conductor 231, contact 236, conductors 237, 238 to motor M. From L3 through conductor 243, contact 242, conductors 241 and 239, to motor M. From L1 through conductor 212, conductor 234 to motor M. The circuit to the motor while the reel is being rotated in a clockwise direction may be traced as follows: from L2 conductors 231, 244 and 245, contact 246, conductor 239 to motor M. From L3 through conductor 243, 248, contact 247, conductor 238 to motor M. From L1 through conductors 212, and conductor 234 to motor M. At the same time, one of the normally closed contactors 209 or 211 is opened by either of the energized relay coils 177 or 178, to open the circuit to the switches 71 and 72 thereby making them inoperative regardless of the position of the cam shoe 69. Also, at this time, a circuit is completed through the magnetic brake to energize same which is traced for the contacts of relay 177 from the line L1, through conductors 212 and 251, contact 252, conductors 253, 254, electro-magnetic brake 55, conductors 255 and 231, to the line L2. Said energizing of the magnetic brake is also traced for the contacts of the relay 178 from the line L1, through conductors 212 and 256, contacts 257, conductor 254, electro-magnetic brake 55, conductors 255 and 231, to the line L2.

The replacement web roll 32b having taken the position previously occupied by the running roll 32a, as in Figures 2 and 20, the attendant next swings the twin frame structure 81 downward to the position also shown in Figures 2 and 20 and is then ready to join the running web to the web of the replacement roll, the speed of the latter having been accelerated to substantially the same speed as the running web by engagement of the roll with the belts 34.

When the running web roll has been reduced to a predetermined size, the attendant will press the push button 129 on the arm 33 which supports the replacement roll, which will cause the web deflector and brush portion to be drawn forward after the switch 128 is closed, to effect a join between the running web and the web replacement roll and after said join is completed the running web is cut below the join as previously described.

The parts which are electrically operated when the push button 129 is pressed are traced through the circuit as follows:

From the line L1 the circuit is completed through conductors 212, 234, 260 and 261, one brush 262 and slip ring 263, conductor 270, switch contactor 127, conductor 128, push button 129, conductor 271, then through slip ring 265, brush 264, a conductor 266 and relay coil 179, then through conductors 267, 268, 244 and 231 to the line L2. The slip rings 263 and 265 are suitably mounted over the reel shaft 28 to rotate with the reel 27 and the brushes 262 and 264 are suitably mounted so as to remain in contact with the said slip rings. When the push button 129 is pressed the circuit will not be completed until the switch 127 is closed by the cam 126, which cam and push button are connected in series with the conductors 270 and 271, which conductors are secured to the slip rings 265 and 263 respectively. A completed circuit through the above will thus energize the relay solenoid 179 and cause a circuit to be completed to the latch releasing solenoid 115 to release the web deflector frame 82 as aforedescribed. The circuit through the said solenoid 115 is completed from the line L2 through conductors 231, 244, 268, contacts 272, conductor 273 through solenoid 115, then through conductors 260, 234, and 212 to the line L1.

During the last part of the period that the twin frame structure 81 is swung downward and until the web join is made, the circuits to the motor 54 are broken and the motor brake circuit is energized. These conditions are the result of the engagement of the cam plate 157 with the switch actuating arm 156 of the switch 155, which cam plate is movable with the shaft 84 that supports the web deflector frame 82. When the above condition occurs, a circuit is completed to energize the relay solenoid 174, which will open the normally closed contacts 205 thereby making the motor 54 inoperative, and is traced from the line L2 through conductor 203, relay coil 174, conductor 280, closed contacts on switch 155, conductor 281, conductor 206, contacts 207, conductor 208, contacts 209, conductor 210, contacts 211, conductor 212 to line L1. The relay coil 174, having thus been energized, will open the normally closed contacts 205 which will open the circuit between the motor 54 and the cam actuated switches 71 and 72, to prevent any movement of the floating web roller from energizing the motor circuit. Said energized relay coil 174 will also cause a closure to be made of the contacts 282 which will complete a circuit to the magnetic brake 55 and is traced from the line L2 through conductors 231 and 255, magnetic brake 55, conductor 283, contacts 282, conductors 284 and 206, contacts 207, conductor 208, contacts 209, conductor 210, contacts 211 and conductor 212 to the line L1.

After the join is made and the cutter 93 is actuated to sever the running web as previously described, the cam plate 157 will move beyond the arm 156 to permit same to drop and cause the switch 155 to open, thereby returning the complete circuit to its normal running condition.

In addition to the functions previously described, provision is made for applying additional braking action to the web roll when the press is decelerated rapidly. Controllers for newspaper presses are generally provided with an emergency stopping button, which in addition to breaking the circuit to the motor is usually arranged to apply brakes to the motor and to the printing cylinders. In Figure 22 relay 171 is indicated and it is intended that this be connected in circuit so as to be operated by the emergency stop push button. Thus when the machine is stopped quickly this relay is energized, closing contacts 286 which completes a circuit that may be traced from L1 through conductor 249, contacts 286, conductor 221, and relay 176 to L2. The motor 54 is thereby energized in the same manner as when operated to increase tension on the web, and the increased braking pressure on the roll is maintained until the relay 171 is deenergized on the stopping of the press driving motor.

It is to be understood that while the foregoing description of the electrical circuits relates to the use of alternating current as the power source that direct current may be used, if desired, and that any alterations in the wiring which are required for the change of current can readily be made by those familiar with this art.

It will be observed from the foregoing that a simplified form of web supply mechanism and means for controlling same has been provided which is positive in operation and permits a web join to be made between the web of an expiring web roll and that of a replacement roll, in a most efficient manner.

It will be understood that the invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

What we claim is:

1. In a web supply mechanism for a machine operating upon a web drawn from a web roll, a roll support adapted to move a replacement roll from a loading position to a running position, a web deflecting mechanism and a web cutting mechanism movable into a pre-joining and a pre-cutting position, spring means to actuate the web deflecting mechanism to effect a join, and an electrically controlled latch member to lock said web deflector against the tension of the spring, a sheath engaging the web when in a pre-cutting position and a normally latched protractable cutter blade within said sheath, a manually controlled circuit and a timing mechanism cooperating therewith to trip the web deflecting mechanism, and means to trip the cutter latching mechanism, whereby a join is made between the running web and the web end of the replacement roll, and the running web is severed immediately thereafter.

2. In a web supply mechanism for a machine operating upon a web drawn from a web roll, a roll support adapted to move a replacement roll from a loading position to a running position, a web deflecting mechanism and a web cutting mechanism movable into a pre-joining and a pre-cutting position, spring means to pull the web deflecting mechanism forward, a latch to hold the deflecting mechanism in a non-operative position, manually controlled means to release said latch when a web join is to be made, whereby the deflecting mechanism is pulled forward to move the running web into engagement with an adhesive portion on the web end of the replacement roll, a sheath on the end of the cutting mechanism having a protractable cutter blade within same, a latch to maintain said cutter blade in a retracted position, and means to release said latch after the web join is made to actuate the cutter and sever the running web below the join.

3. In a web supply mechanism, the combination with a running web roll having a web drawn from same, of a replacement roll movable into close proximity with the running web, a web deflecting frame having a brush portion thereon and a cutter frame member having a cutting member and a sheath for the cutting member thereon, a latch member to join said frames, spring means to pull the web deflecting frame and the sheath on the cutting member against the running web when in a pre-pasting and pre-joining position, a spring actuated cutter blade slidably mounted within said sheath and latch means to hold same in a retracted position, a manually controlled means to release the deflecting frame latch and thereby permit the brush portion on the deflecting frame to force the web into engagement with an adhesive on the web end of the replacement roll to make a join, and means rotatable with the replacement roll to release the cutter latch and cause the running web to be severed below the join.

4. In a web supply mechanism for a machine operating upon a web drawn from a web roll, a roll support adapted to move a replacement roll from a loading position to a running position, a twin frame structure comprising a web deflector frame and a cutter frame, each being pivotally mounted and having the same axis and adapted to be manually moved from a normal inoperative position to a pre-joining position, a latch to normally maintain the said frames in locked engagement, a spring means adapted to hold the twin frame structure in an inoperative position and adapted to exert a forward pulling tension upon the deflecting frame when in a pre-joining position, a brush portion on said web deflector frame and a cutter sheath mounted on the cutter frame, said sheath having an open front end over which the running web is tightly stretched, a cutter blade slidably mounted within said sheath and latched in a retracted position, manually controlled means to release the web deflecting frame latch, whereby the brush portion is moved forward and forces the running web into engagement with an adhesive portion on the web end of the replacement roll to make a join therewith, and means rotatable with the replacement roll to trip the cutter latch member, whereby the cutter blade is spring ejected beyond the edge of the sheath and the running web is severed.

5. In a web supply mechanism for a machine operating on a web drawn from a web roll, a roll support adapted to move a replacement roll from a loading position to a running position, a web joining and cutting mechanism comprising a swinging twin frame structure consisting of a web deflecting frame and a cutter frame and adapted to be manually moved from a non-operative position to a pre-joining and cutting position, a latching means to normally maintain the twin frames in locked engagement, spring actuated means connected to the web deflecting frame, a stop to limit the movement of the cutter frame, a spring actuated cutter blade slidably mounted in a sheath, and adapted to be ejected beyond the edge of the sheath, latch means to normally maintain said cutter blade in a retracted position, manually controlled means to release the web deflecting frame latch, whereby the frame is drawn forward under the influence of the spring means and a portion of said frame is adapted to move the running web into contact with an adhesive portion on the web of the replacement roll to make a join, and means rotatable with said replacement roll to release the cutter latch, whereby said cutter is ejected beyond the sheath edge to sever the running web below the join.

6. In a web supply mechanism for a machine operating on a web drawn from a web roll, a roll support adapted to move a replacement roll from a loading position to a running position, a web joining and cutting mechanism comprising a latched twin frame structure, simultaneously movable to a pre-joining and pre-cutting position, one frame having a brush mounted thereon and the other frame having a cutter mounted thereon, manually controlled means to release the latch when the running web roll has become exhausted, spring actuated means to pull said brush carrying frame forward to press the running web against an adhesive on the web end of the replacement roll, and means rotatable with the web replacement roll to actuate the cutter, whereby the running web is severed below the join.

7. In a web supply mechanism, a support for a running web roll and a replacement roll, manually controlled means for rotating said support upon partial exhaustion of the running web roll, a pivotally supported twin frame structure, one frame carrying a web deflecting member and the other frame carrying a web cutter, said twin frame structure being manually movable to a pre-joining and pre-cutting position, a driven belt engaging the peripheral surface of the replacement web roll to rotate same at substantially the speed of the running web, spring actuating means adapted to move the web deflecting frame member toward the running web, means controlled by a push button and timing mechanism to permit the spring actuating means to move the web deflecting frame member into engagement with the running web and press said web against an adhesive portion on the web of the replacement roll to make a join, and a means rotatable with the replacement roll to actuate the cutter and thereby sever the running web below the join.

8. In a web changing system, the combination with a web roll support having a running web roll and a replacement roll mounted thereon, of a means for moving the replacement roll into a web joining position, means for pressing the running web against an adhesive portion on the replacement roll to make a join, and a means for severing said running web after a join is made, comprising a cutter blade slidably mounted between two sheath plates, said sheath plates having an open front portion over which the running web is drawn, spring means to actuate said cutter, and a latch to hold same retracted against the tension thereof, and means for automatically releasing said latch after a join is made, whereby the cutter blade is snapped forward and severs the web which is stretched in the path of same.

9. In a web changing system, the combination with a web roll support having a running web roll and a replacement roll mounted thereon, of a means for moving the replacement roll into a web joining position, means for pressing the running web against an adhesive portion on the replacement roll to make a join, and a means for severing said running web after a join is made, comprising a cutter blade slidably mounted between two sheath plates, said sheath plates having an open front portion over which the running web is drawn, spring means to actuate said cutter and a latch to hold same retracted against the tension of said spring, pins mounted between said sheath plates engaging angularly disposed slots in the cutter, a lug movable with the rotation of the replacement roll and adapted to trip the said latch after a web join is made to thereby release the cutter blade and permit same to be snapped forward in an angular direction into cutting engagement with the running web.

10. In a web joining mechanism, the combination with a mounting having a running web roll and a replacement roll, of means to bring the replacement roll into close proximity to the running web and a web deflecting frame structure and a web cutting frame structure simultaneously movable from a non-operative position to a pre-joining position, a cutter on said cutting frame, a latch member to normally maintain said frames in a locked relation, a spring engaging said deflector frame arranged to pull the joined frames against a stop, a solenoid member joined to said latch, an electrical circuit for said solenoid, having a manually controlled switch and an automatically actuated switch also in said solenoid circuit, whereby the web deflector frame is released when the running web roll becomes exhausted and the release is timed to permit the deflector to press the running web against the replacement roll before an adhesive portion on the web end of same approaches the running web, a lug rotatable with the replacement web roll, and means moveable into the path of said lug by the forward movement of the deflector frame to actuate the cutter and thereby sever the running web.

11. In a web severing mechanism, the combination of a sheath, and a cutter blade slidably mounted within said sheath, guide means to direct the movement of said cutter blade in a diagonal direction, a spring having its ends anchored to said sheath and blade, and means to latch said blade against the tension of the spring.

12. A mechanism for severing a web drawn from a web roll comprising a sheath adapted to engage said web, a cutter blade slidably mounted within said sheath, spring means to actuate said blade, and means to direct the movement of same in a diagonal direction, a manually actuated member to move the blade to a retracted position, and a latch to retain same in said retracted position until released.

13. A mechanism for severing a web drawn from a running web roll after a join is made with a replacement roll, comprising a sheath adapted to engage said running web, a cutter blade slidably mounted within said sheath and having a cutting edge which is adapted to be snapped to a position beyond the edge of the sheath, spring means to actuate said blade, and means to direct its movement in a diagonal direction, a manually actuated member to move said blade to a retracted position, a latch to retain same in a retracted position, and a mechanism whereby said latch is tripped after a join is made to cause the blade to sever the web below the join.

14. In a web supply mechanism, the combination with a rotable support having a running web roll and a replacement web roll thereon, of means to make a join between the web of an expiring web roll and the web end of the replacement roll, which includes a frame pivotally mounted for easy swinging movement between a non-operating position and a pre-joining position entirely by hand and having a web deflector and a web cutting mechanism operably associated therewith, a spring connected to the frame and tensioned to constantly urge it away from its pre-joining position, releasable locking means to hold the frame in its pre-joining position against the pull of the said spring, and electrically controlled means to operate the web deflector and the web cutting mechanism in timed relation with the rotation of the replacement roll to join the webs and sever the web of the expiring web roll.

15. In a web supply mechanism, a rotatable support for a running web roll and a replacement roll, means for making a web join between the web of a running web roll and the web end of a replacement web roll which includes a swinging counterbalanced frame structure manually movable to pre-joining and inoperative positions and having a web deflector and a web cutting mechanism, spring means to hold the frame structure in pre-joining and inoperative positions and to move the web deflector towards the replacement roll to make a web join, and means for operating the web cutting mechanism after the join is made.

16. In a web supply mechanism, the combination with a rotatable support having a running web roll and a replacement roll thereon, of means to make a web join between the web of an expiring web roll and the web end of the replacement roll, which includes a frame structure having a handle thereon whereby it may be moved by direct hand operation to and from a pre-joining position, a web deflector and a web cutting mechanism carried by said frame structure, a spring arranged to pull the web deflector toward the replacement roll and arranged also to hold the frame structure in a non-operating position, a latch to normally hold the web deflector away from the replacement roll and against the pull of said spring, means to release said latch to effect a web joining operation, and means for operating the web cutting mechanism after a web join is made.

17. In a web supply mechanism, the combination with a rotatable support having a running web roll and a replacement roll thereon, of means to make a web join between the web of an expiring web roll and the web end of the replacement roll, which includes a pivotally supported and counterbalanced frame structure having a handle thereon adapted to be grasped to move the frame by hand to and from a pre-joining position, a web deflector and a web cutting mechanism carried by said frame structure, a spring arranged to pull the web deflector toward the replacement roll and also to hold it in a non-operating position, a latch to normally hold the web deflector away from the replacement roll and against the pull of said spring, manually controlled means to release said latch to effect a web joining operation, and means for operating the web cutting mechanism after a web join is made.

18. In a web supply mechanism, the combination with a rotatable support having a running web roll and a replacement roll thereon, of means to make a web join between the web of an expiring web roll and the web end of the replacement roll, which includes a pivotally supported and counterbalanced frame structure having a handle thereon adapted to be grasped to manually move the frame to and from a pre-joining position, a web deflector and a web cutting mechanism carried by said frame structure, spring actuated means to hold the frame structure in prejoining position and to pull the web deflector toward the replacement roll, a latch to normally hold the web deflector in a retracted position away from the replacement roll and against the pull of said spring actuated means, solenoid actuated means to release said latch to effect a web joining operation, and means for operating the web cutting mechanism after a web join is made.

19. In a web supply mechanism, the combination with a running web roll having a web drawn therefrom, of a replacement roll having an adhesive portion thereon and movable into close proximity with the running web, a web deflecting frame, a cutter frame, a latch to join said frames, spring means operatively connected with said web deflecting frame, manually controlled means to release said latch to thereby disconnect said web deflecting frame from the cutter frame and through the spring means deflect the running web against the adhesive portion on the replacement roll to make a web join.

20. In a web cutting mechanism for use in cutting the web from a web supply roll after a join has been made between a replacement roll and the web of a running web roll, a support for said replacement web roll and running web roll, a cutting member having latching means to latch same in a non-cutting position, and a striker means rotatable with the replacement roll adapted to engage and release the latching means to thereby effect a web cutting operation.

21. In a web supply mechanism for a machine operating upon a web drawn from a web roll, in combination, a replacement web roll rotation controlling running belt engaging the periphery of the roll, means to drive said belt, means to support said belt, said belt support being movable to increase or decrease the wrap of the belt around the web roll and thus vary the roll controlling effect thereof and bring it up to the speed of an adjacent running web, means to deflect the running web toward and into contact with the replacement web roll to join it to the web thereof when the roll has been brought up to the speed of the running web by said belt, said belt driving means being adapted to be controlled by the tension of the running web, and means to interrupt the tension of the running web control of said belt driving means, when said web deflecting means is actuated to make a web join.

22. In a web supply mechanism for a machine operating upon a running web being drawn thereinto, in combination, means to dispose a replacement web roll adjacent the running web, a running belt in engagement with the periphery of the roll, means to drive said belt to bring the roll up to substantially the speed of the running web preparatory to having its web joined to the running web and being controlled by the tension on the web running therefrom to control the tension thereof after the join is made, means to deflect the running web ito contact with the replacement roll to effect the joining of the webs, means to sever the running web after a join is made, and means to interrupt the web tension control operation of said belt when the running web is being joined to the web of the replacement roll.

23. In a web supply mechanism for a printing machine, the combination with a rotatable support having a running web roll and a replacement web roll thereon, means to make a join between the web of an expiring web roll and the web end of the replacement roll, which includes a pivotally supported member carrying a belt driven by the machine and movable into position to rotate the replacement roll, a frame pivotally mounted for easy swinging movement between a non-operating position and a pre-joining position entirely by hand and having a web deflector and a web cutting mechanism operably associated therewith, a spring connected to the frame and tensioned to urge it away from its pre-joining position, releasable locking means to hold the frame in its pre-joining position against the pull of the said spring, and electrically controlled means to operate the web deflector and web cutting mechanism sequentially in timed relation with the rotation of the replacement roll to join the webs and sever the web of the expiring web roll.

24. In a web supply mechanism for a machine operating upon a web drawn from a web roll, a roll support adapted to move a replacement roll from a loading position to a position adjacent the running web, a web deflecting mechanism and a web cutting mechanism pivotally supported and counterbalanced to swing freely, and directly movable by hand to and from a pre-joining and a pre-cutting position, spring means to hold the web deflecting mechanism and the web cutting mechanism in pre-joining position and to operate said web deflecting mechanism, a latch to hold the web deflecting mechanism in pre-joining position against the tension of said spring means, and manually controlled means to release said latch when a web join is to be made.

25. In a web supply mechanism for a machine operating upon a running web being drawn thereinto, in combination, means to dispose a replacement roll adjacent the running web, press driven means including a running belt in engagement with the periphery of the roll and arranged to accelerate the roll to substantially the speed of the running web preparatory to having its web end joined to the running web, means responsive to variation in the tension on the web running to the machine for controlling movement of the running belt, means movable to deflect the running web into contact with the replacement roll to effect joining of the webs, and means actuated by movement of the web deflecting means to energize the belt controlling means.

26. In a web supply mechanism, the combination of a rotatable support having a running web roll and a replacement web roll thereon, with means to make a join between the webs of the said rolls, which includes a frame structure movable to and from a pre-joining position adjacent the replacement web roll, a spring adapted to maintain the said frame structure in a non-operative position remote from the roll, and alternatively, to urge the said frame structure toward the web joining position, a releasable latch mechanism to hold the frame structure in pre-joining position, and means on said frame structure adapted to be grasped to move the frame structure entirely by hand from and to the non-operative and pre-joining positions against the urge of the said spring.

ARVID LUNDQUIST.
RAYMOND A. FREEMAN.
WILLIAM C. WIEKING.

CERTIFICATE OF CORRECTION.

Patent No. 2,278,182.

March 31, 1942.

ARVID LUNDQUIST, ET AL.

It is hereby certified that error appears in the printed specification of the above numbered patent requiring correction as follows: Page 7, second column, line 37-38, claim 3, for "pre-pasting and pre-joining" read --pre-joining and pre-cutting--; page 10, first column, line 14, claim 22, for "ito" read --into--; and that the said Letters Patent should be read with this correction therein that the same may conform to the record of the case in the Patent Office.

Signed and sealed this 29th day of May, A. D. 1945.

Leslie Frazer (Seal)

Acting Commissioner of Patents.